United States Patent [19]
Hoffmeister

[11] Patent Number: 5,769,990
[45] Date of Patent: Jun. 23, 1998

[54] METHOD OF MAKING TIRE WITH TIRE TREAD PITCH BANDS

[75] Inventor: Kurt Matthew Hoffmeister, Ames, Iowa

[73] Assignee: Michelin Recherche et Technique S.A., Switzerland

[21] Appl. No.: 453,179

[22] Filed: May 30, 1995

(Under 37 CFR 1.47)

Related U.S. Application Data

[62] Division of Ser. No. 263,318, Jun. 21, 1994, abandoned.

[51] Int. Cl.[6] .......................... B29D 30/00; B60C 113/00
[52] U.S. Cl. ................................... 156/110.1; 152/209 R; 425/46
[58] Field of Search .......................... 152/209 R, 209 A, 152/209 B; 156/110.1; 425/28.1, 46, 47

[56] References Cited

U.S. PATENT DOCUMENTS

| | | | |
|---|---|---|---|
| 1,956,011 | 4/1934 | Evans | 152/14 |
| 2,124,821 | 7/1938 | Hubach | 152/209 |
| 2,254,778 | 9/1941 | Hoover | 152/209 |
| 2,255,994 | 9/1941 | Bush | 152/209 R |
| 2,424,608 | 7/1947 | French | 152/209 R |
| 2,878,852 | 3/1959 | Lipmann et al. | 152/209 |
| 3,023,798 | 3/1962 | Moore et al. | 152/209 |
| 3,926,238 | 12/1975 | Vorih | 152/209 |
| 3,989,780 | 11/1976 | Vorih | 264/40.1 |
| 4,178,199 | 12/1979 | Lippman et al. | 156/110 R |
| 4,327,792 | 5/1982 | Landers | 152/209 R |
| 4,474,223 | 10/1984 | Landers | 152/209 R |
| 4,598,748 | 7/1986 | Campos et al. | 152/209 R |
| 4,936,364 | 6/1990 | Kajiwara et al. | 152/209 A |
| 5,120,209 | 6/1992 | MacMillan | 425/47 |
| 5,240,054 | 8/1993 | Kogure | 152/209 R |
| 5,261,804 | 11/1993 | Jachowsky | 425/47 |
| 5,290,163 | 3/1994 | Katsumata et al. | 425/47 |
| 5,309,965 | 5/1994 | Williams | 152/209 R |

FOREIGN PATENT DOCUMENTS

| | | | |
|---|---|---|---|
| 114594 | 8/1984 | European Pat. Off. | 152/209 R |
| 0 367 557 | 5/1990 | European Pat. Off. . | |
| 0524568 | 1/1993 | European Pat. Off. . | |
| 0528577 | 2/1993 | European Pat. Off. . | |
| 0542493 | 5/1993 | European Pat. Off. . | |
| 4-123907 | 4/1992 | Japan . | |

Primary Examiner—Steven D. Maki
Attorney, Agent, or Firm—Alan A. Csontos; Robert R. Reed

[57] ABSTRACT

The tread of the tire of this invention is made using tread bands that have a variable pitch length. That is, the variable pitch length tread bands have a first pitch length on one axial side of the tread band and a second pitch length on the other axial side of the tread band. The transition between the first and second pitch lengths can be a gradual change across the tread band widthwise or a relatively abrupt change. The preferred tire has a tread band where the change in pitch length is widthwise within a groove of the tread. Tread bands of this invention have circumferential edges that mesh with each other such that one variable length tread band can be used with its smaller pitch length on one lateral side of the tread or rotated end to end and used with the smallest pitch length on the other lateral side of the tread of the tire. A method for producing a tread band having a change in the pitch length is also given in this invention. The result is a tire that effectively has twice the number of pitch lengths sequenced around the tire as there are separate tread bands. Reduced tread noise is achieved with a greater number of pitch lengths. Alternately stated, the tread of the tire of this invention has a reduced tread noise when using the same number of different tread bands. A single mold for providing a plurality of variable pitch length tread bands on the molded tire is also within the scope of this invention.

4 Claims, 7 Drawing Sheets

METHOD OF MAKING TIRE WITH TIRE TREAD PITCH BANDS

This is a divisional of application Ser. No. 08/263,318 filed on Jun. 21, 1994 now abandoned.

BACKGROUND OF THE INVENTION

1. Field of the Invention

This invention relates to a pneumatic tire used for vehicles, and more particular to tread bands that reduce the noise generated on contact with a supporting surface.

2. Discussion of the Art

Noise and vibrations produced by the tread of a tire are the result of a number of different disturbances as the tire rolls in contact with a ground surface. The tire is made with a tread having elements to grip the ground surface and provide traction. Tread and tire elements vibrate and air disturbances exist upon impact with the ground surface creating pulses of air borne audio frequencies and vehicle vibrations. The interaction of all pulses creates what is referred to as tire noise. It has been the goal of many investigators to reduce the amplitude of tire noise peaks such that no objectionable audio and vehicle vibration problems exist.

It is known in the art that the noise produced by the tread of a tire is modulated by selectively pitching and sequencing the load carrying elements. An array of load carrying elements is characterized by the relative pitch lengths of the various elements which are in the form of a tread band across the width of the tread. Each tread band has its own pitch length and is sequenced around the circumference of the tire with at least one other tread band having another pitch length. The greater the number of bands and the number of different pitch lengths the better distributed the noise can become over an audio frequency range. It is common to utilize random or sinusoidal sequencing of the respective bands of different pitch length in an attempt to modulate the tire noise peaks.

A number of patents have disclosed tire treads that distribute the acoustic energy produced by the rotating tire uniformly over a wide frequency band. Methods for spreading the noise generated by sequencing the tread bands of a tire are detailed in U.S. Pat. Nos. 3,926,238; 4,178,199; 4,327,792; 4,474,223; 4,598,748; and 5,240,054. Each of these patents disclose the importance of the relative pitch lengths and the sequencing of load supporting elements to achieve modulation of tire noise over a broad frequency spectrum. Once the load supporting elements are generally defined, it is well known how to change the overall size of a plurality of tread elements or bands and position them around the circumference of the tire to modulate tire noise. These patents provide background information for the generic tire noise problem.

An increase in number of bands and the number of different pitch lengths allows the designer much more of an opportunity to modulate the tire noise. However, tire molds have become much more difficult to construct and the cost of such molds increases with the increasing number of different pitch lengths. That is, the fewer the number of different bands the less expensive the tire mold. U.S. Pat. No. 3,989,780 discloses some of the difficulties in using a variety of pitch lengths and sequencing tread bands in the tire mold building operation. This patent also discloses the desire to utilize a minimum number of pitch lengths, preferably two, for use in a tire tread to reduce cost. U.S. Pat. No. 3,989,780 further discloses a method to select relative pitch lengths of a string of design elements (tread blocks) consisting of at least three elements of identical length, and modulating the noise spectrum distribution by varying the length and sequential positioning of said strings. The elements of this patent are tread blocks having the same shape but variations in their size only. This is a typical approach to noise modulation.

The use of two separate circumferential sections of a tire tread, each with tread bands having their own separate pitch lengths and sequence, is disclosed in European Patents Applications (EP) 0,524,568 and 0,528,577. The two different segments across the tread width are separate and distinct from one another. This is possible when a clamshell type mold (mold half) is used which divides the tire circumferentially on a plane parallel to the midcircumferential plane. This solution is not feasible with a segmented mold, common in the industry. It is disclosed in EP 0,528,577 that each base pitch can extend transversely over only a single circumferential section of the tire, being a single rib or combination of ribs. The construction of a mold to achieve this is not disclosed. The sequence of each half section can be rotated and modulated with the other half section of the tire tread to further reduce tire noise. This would require a large number of different tread bands in a segmented mold.

European Patent Applications (EP) 0,542,493 also discloses the use of a plurality of base pitches or pitch lengths that may extend widthwise over a single circumferential section to include a circumferential rib or a combination of ribs. The base pitches are repeated to form the complete tread. No disclosure is given to define a method to combine the widthwise sections or how they may be achieved in a mold.

The art teaches that using a larger number of tread bands will modulate the tread noise and spread the noise more uniformly over a band of frequencies. However, the need remains to achieve the modulation of tire tread noise with a plurality of pitch lengths in sequence circumferentially around the tire with a minimum number of different tread bands. Also, a method to achieve better modulation of tread noise with any selected sequencing technique and a given number of tread bands remains.

SUMMARY OF THE INVENTION

One object of the invention of the applicant is to formulate a method to use in modulating the noise magnitude as a function of the noise spectrum for tread features of a tire by utilizing a minimum number of different mold segments to form the tread portion of a tire. The relative size and orientation of tread bands are important considerations to achieve this objective.

A further object of this invention is to teach one skilled in the art how to obtain a single tread band that can be used in two different orientations on the tread of a tire to reduce tire noise.

The tire of this invention has a tread portion divided into a plurality of load carrying tread bands which extend widthwise across the tire and are sequenced circumferentially around the tire. The improvement of this invention is based on the individual shape, orientation and pitch lengths of the tread bands. The tire has at least one variable pitch length tread band having a first pitch length on one axial side and a second pitch length on the other axial side. The tread band is utilized both with the first pitch length positioned on one lateral side of the tread portion of the tire and, when rotated, the first pitch length is positioned on the other lateral side of the tread. The tread band is such that one circumferential edge of the variable pitch length band will mesh with the other circumferential edge of the variable pitch length band when rotated.

Tires are cured in a mold to form the tread surface during the operation of making the tire. A parallel embodiment of this invention includes a single mold segment for a plurality of tread bands extending widthwise across a molded tire comprising a first pitch length on one axial side of the mold segment being greater than a second pitch length on the other axial side of the mold segment. The mold segment further comprises a circumferential edge which will mesh with the other circumferential edge of the mold segment when the mold segment is rotated end to end. The mold segment thereby providing a plurality of tread bands of the tire during the curing operation of making the tire.

In a further embodiment of this invention, a method for producing a change in the pitch lengths of a plurality of load carrying tread bands circumferentially around a tread portion of a tire is given. This method achieves a modulated sequence of pitch lengths by a series of a minimum of seven steps. In step one, a minimum pitch length is selected along with a maximum pitch length for the tread using a ratio of the minimum pitch length to the maximum pitch length. In a second step, a first variable pitch length tread band is defined having the minimum pitch length on one axial side and a second pitch length on the other axial side. For the third step, a second variable pitch length tread band is defined having a third pitch length on one axial side and the maximum pitch length on the other axial side of the second tread band. The third pitch length is greater than the minimum pitch length but less than the second pitch length. The maximum pitch length is greater than the second pitch length.

In the fourth step, both circumferential edges of both the first and the second variable pitch length tread bands are profiled to be the same. This makes the four edges compatible so that they will mesh with one another regardless of the axial end to end orientation of the first and second tread bands. The fifth step is to incorporate the first and second tread bands with profiled edges to form the tread of the tire. The first and second tread bands are both orientated with a smallest pitch on one axial side of the tread as well as an orientation with the smallest pitch length on the other axial side of the tread of the tire. In the sixth step, the first and second tread bands in both orientations are sequenced circumferentially around the tread in a predetermined order to form a tread surface of the tire for contact with a supporting surface for the tire. Finally, the seventh step provides for modulating and changing the selected pitch lengths and the sequence in step one and step six to achieve a reduced noise level from the tire when rolling in contact with the supporting surface.

BRIEF DESCRIPTION OF THE DRAWINGS

Further features of the present invention will become apparent to those skilled in the art to which the present invention relates from reading the following with reference to the accompanying drawings, in which.

DESCRIPTION OF THE PREFERRED EMBODIMENTS

Figure 1:
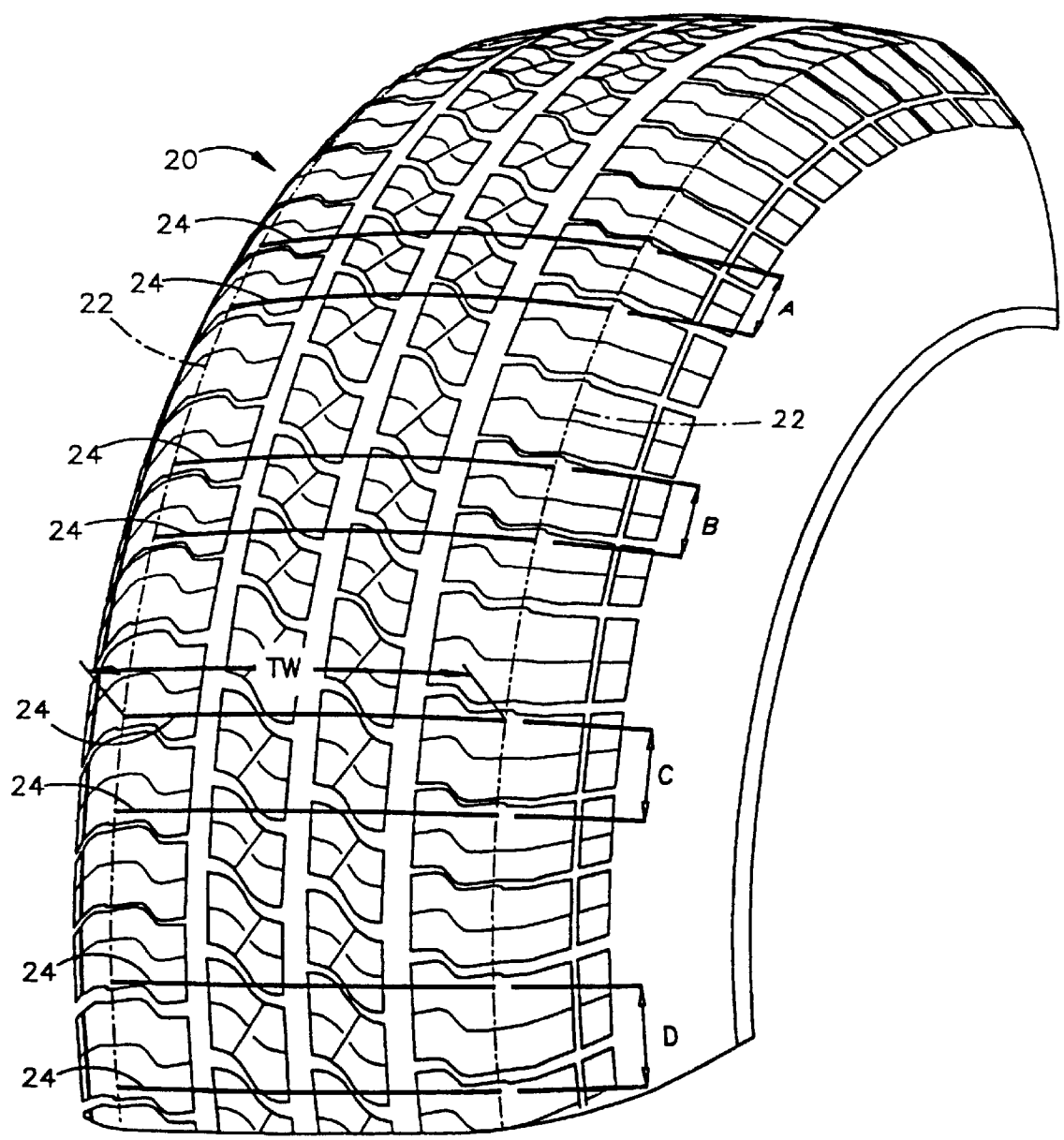
FIG. 1 is a prospective view of a segment of a tire showing constant pitch length tread bands of the prior art.

A typical tread for a tire is illustrated in FIG. 1. This tire 20 has a tread with four tread bands of different pitch lengths A–D. A tread band has a length across the axial width of the tire equal to the tread width TW of the tire. The tread width TW is that portion of the tire in contact with the supporting surface when the tire is mounted, inflated and loaded according to tire standards in the industry. These standards are defined by the Tire and Rim Association, Inc. (T&RA) of Copley, Ohio. The limits of the tread width TW is shown by the dashed lines 22 in FIG. 1. The two circumferential edges 24 of each tread band defines its limit circumferentially around the tread of the tire. The four tread bands are shown separated from one another to illustrate that there are four different pitch lengths A through D. In fact, each tread band would interface with another tread band at a circumferential edge 24. The number and position of each tread band of different pitch length are selected according to a sequence criteria to give a low noise level as the tread contacts the supporting surface. Numerous techniques to provide proper sequence criteria are known in the industry. It is further known that a greater number of different pitch lengths can provide lower noise levels. However, the greater the number of tread bands the higher the manufacturing costs for the tire 20. The constant pitch length tread bands illustrated in FIG. 1 are typical in the art and give one pitch length for one tread band. The scope of this invention includes the use of variable pitch length tread bands to achieve the effect of a larger number of pitch lengths with a limited number of different tread bands.

Figure 2:
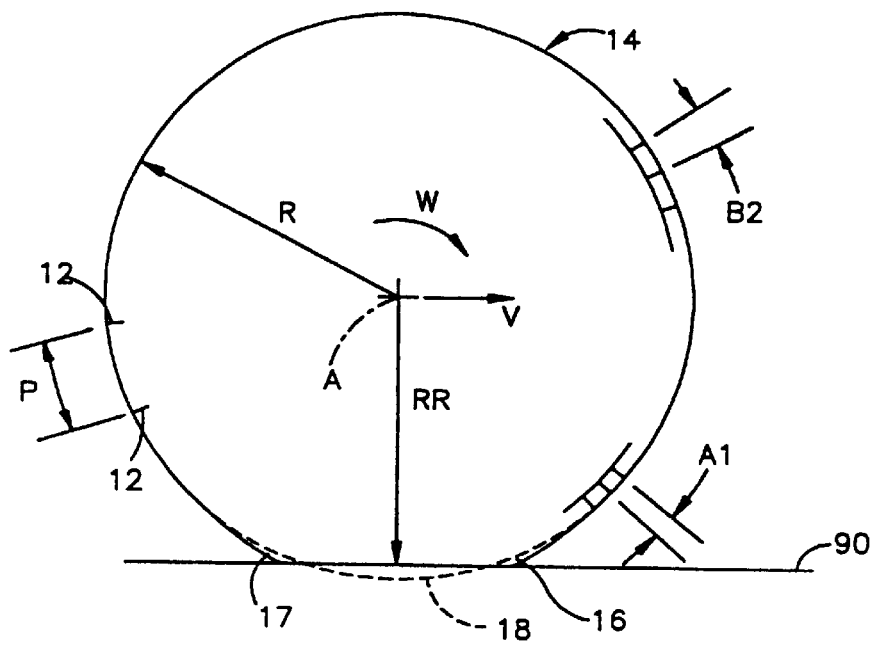
FIG. 2 is a schematic of the side view of a tire tread in contact with a supporting surface.

Tire noise can best be studied by investigating the frequency of contact between a tire tread feature and the supporting surface. The more frequent the contact the higher the frequency of the tire and vehicle vibrations which produce noise. To investigate this in more detail, refer to the illustrations of FIGS. 2 and 3. A schematic side view of a tire tread 14 in contact with a supporting surface 90 is illustrated in Fig. 2. The tread 14 has one radius R when free to expand and another radius RR when rolling about its axis of rotation A in contact with the ground 90. The tire tread deforms radially at the leading edge 16 as well as at the trailing edge 17 of contact with the supporting surface. The result of these deformations and the flat contact portion 18 are such that the circumferential length of the tire's tread is not changed due to its contact with the supporting surface. This circumferential length is equal to 2 R and is herein referred to as the development length L of the tire tread 14.

Figure 3:
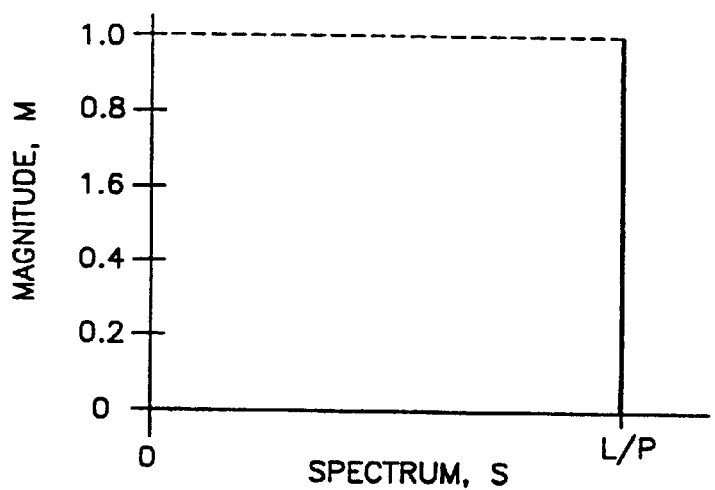
FIG. 3 is a noise magnitude vs. spectrum plot for a tread with one constantly spaced feature.

The speed V of the tire is represented by its angular velocity W expressed in cycles per second. Consider a single surface feature 12 repeated around the tread 14 with a constant spacing distance P between each adjacent pair of features 12. There are L/P features around the development length of the tire. This is referred to as the spectrum S=L/P associated with feature 12. The frequency Hz of the impact of feature 12 with the supporting surface is given by W×L/P and is expressed as cycles per second. If there is only one feature 12 on the tire the magnitude M of the contact is defined as unity (1.0). This is illustrated in FIG. 3 where the magnitude M is plotted against spectrum S and shows only one vertical bar having a magnitude of one.

Figure 4:
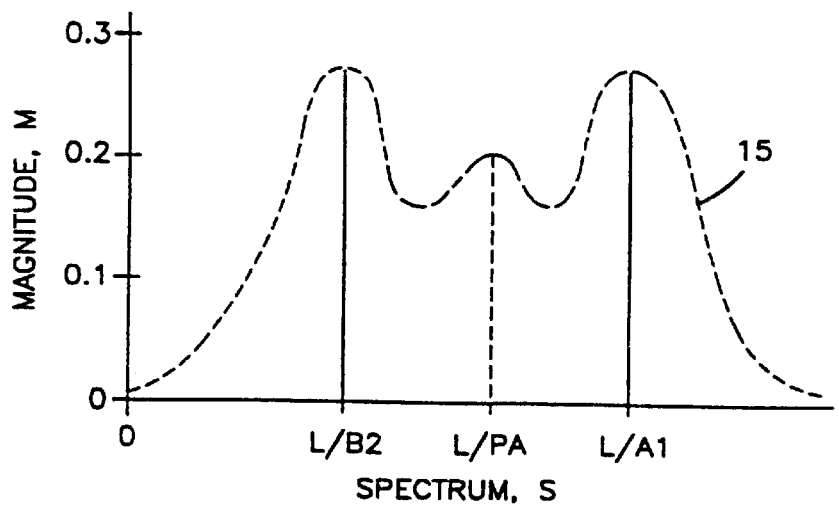
FIG. 4 is a noise magnitude vs. spectrum plot for a tire with a tread having two sequenced features.

When the tread contains more than one feature or the features are not equally spaced, they begin to share frequencies with each other and the magnitude at any one spectrum is less than one. This is illustrated by considering one tread feature having a length A1 and another tread feature having a larger length B2, as shown in FIG. 2. There are two spectrum values; one at S1=L/A1 and another at S2=L/B2. Obviously both features cannot be placed continuously around the development length L at the same time. Therefore, they share space on the tread with each other and no single magnitude as large as 1.0 can exists. There are other spectral values that also have a magnitude, such as that associated with the average PA of A1 and B2. The illustration of FIG. 4 shows a typical magnitude vs. spectrum plot for a tread 14 having two features of different length sharing its development length L. Many other spectrum values will also exist with only two features when such features are randomly placed to share space on the tread 14. A broken line 15 in FIG. 4 illustrates a typical maximum magnitude limit for all specrtum values that likely exist. A tire having lower noise level will have a magnitude vs. spectrum with a broken line 15 with less magnitude variation over the spectrum associated with frequencies SxW in an audible range of about 200 to about 2000 cycles per second. This concept is used to evaluate the tread features of this invention.

The features on a tread of a tire that contact the supporting surface can be considered as individual blocks, grooves in the tire tread or the tread band as a whole having many blocks and grooves. The four tread bands of FIG. 1 have four pitch lengths A–D which are also considered as independent tread features. A key concept of this invention is that only two tread bands can be used to achieve four pitch lengths.

Figure 5:
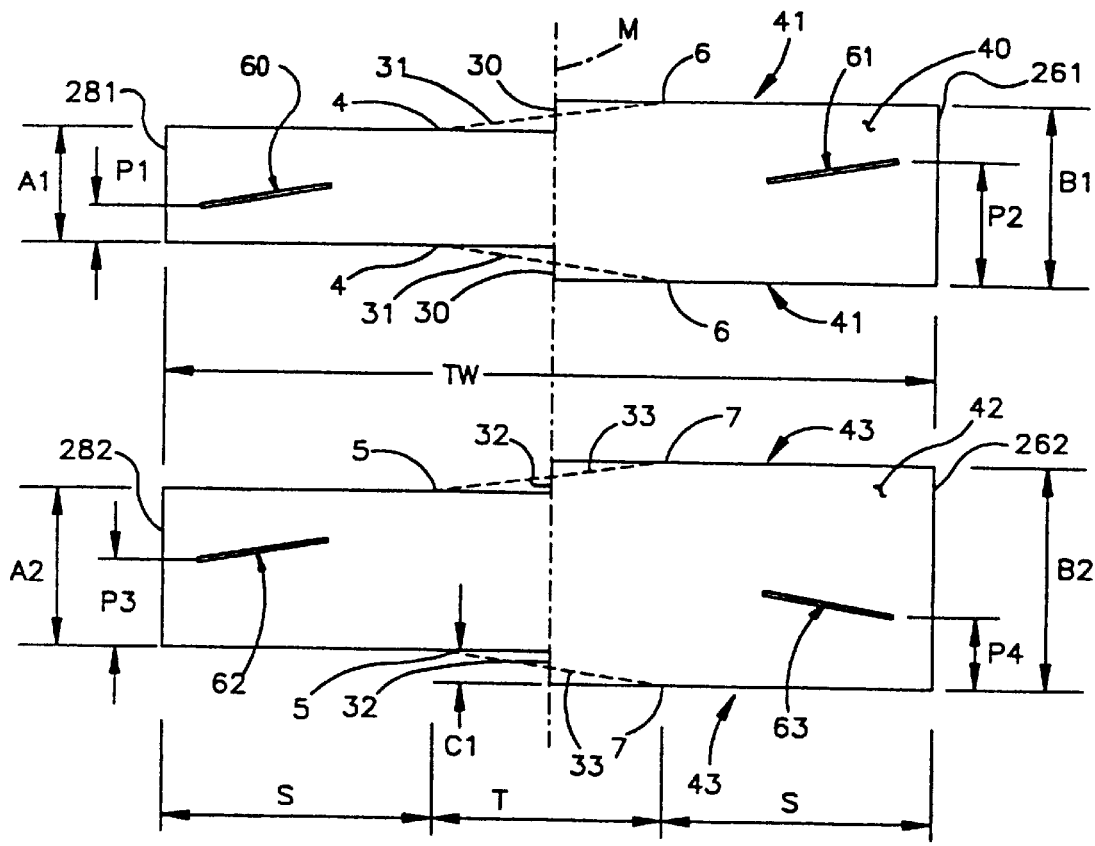
FIG. 5 is two plan views of two tread bands having shapes in accordance with the invention.

In one embodiment of this invention (using two tread bands) the bands 40,42 of FIG. 5 are each shaped to have a variable pitch length. The maximum and minimum pitch lengths, B2 and A1 respectively, are chosen to avoid having tread features which are not appropriate for wear rate or stiffness performance; i.e. having a preferred minimum pitch length A1 of at least 1.0 percent and a preferred maximum pitch length B2 of not more than 2.5 percent of the development length L. The smallest tread band 40 has a second pitch length B1 at one lateral end 261 in addition to the minimum pitch length A1 at the other lateral end 281. The largest tread band 42 has a third pitch length A2 at one lateral end 282 in addition to the maximum pitch length B2 at the other lateral end 262. The maximum pitch length B2 is chosen to avoid having tread features with high stiffness values and the minimum pitch length A1 is chosen to avoid having tread features with low stiffness values. A preferred ratio of the minimum pitch length A1 to the maximum pitch length B2 is in a range of about 0.50 to about 0.75. The third pitch length A2 is selected to be greater than the minimum pitch length A1 but less than the second pitch length B1.

The circumferential edges 41,43 of the two tread bands 40,42 are designed to mesh with each other regardless of the end to end orientation of the tread bands. That is, the smaller tread band 40 can be positioned to have end 281 colinear with either end 262 of the larger tread band 42 or end 261 of another smaller tread band 40 which is rotated end to end. The ability of having circumferential edges 41 and 43 which mesh depends on these edges being symmetrical about the midcircumferential plane M and each edge having the same profile. Changes in the pitch length of the tread bands 40,42 can vary from abrupt changes such as 30 and 32 to gradual changes such as 31 and 33, as illustrated in FIG. 5. Gradual changes can be from a first transition point 4,5 on one axial side to a second transition point 6,7 on the other axial side. The magnitude of the change C1 in pitch length on both sides of either tread block is the same. That is, B1−A1=B2−A2=2×C1. The transition points 4–7 can be located at any distance S from the end of the tread band to provide a long transition length T or a relatively short transition length T. The preferred transition length is such that the transition occurs in a groove of the tire tread pattern.

Tread features within a tread band are also rotated end to end when the tread band is used in both orientations. Tread features 60,61 within a tread band which are symmetrical are repeated on both lateral halves of the tire in the same angular position. Tread features 62,63 within a tread band which are asymmetrical are repeated as asymmetrical when the tread band is rotated. However, the effect of rotating the tread bands helps to make asymmetrical tread features more symmetrical for the overall tread pattern. Two smaller tread bands 40,40 with one rotated to mesh with the other will give tread feature 60 spaced a distance of P1+P2 from symmetrical tread feature 61. If another tread band 40 is added to these two, the new tread feature 60 is now at a different distance from tread feature 61; when P1 is not equal to P2. This fact further helps to modulate the tread noise.

Figure 6:
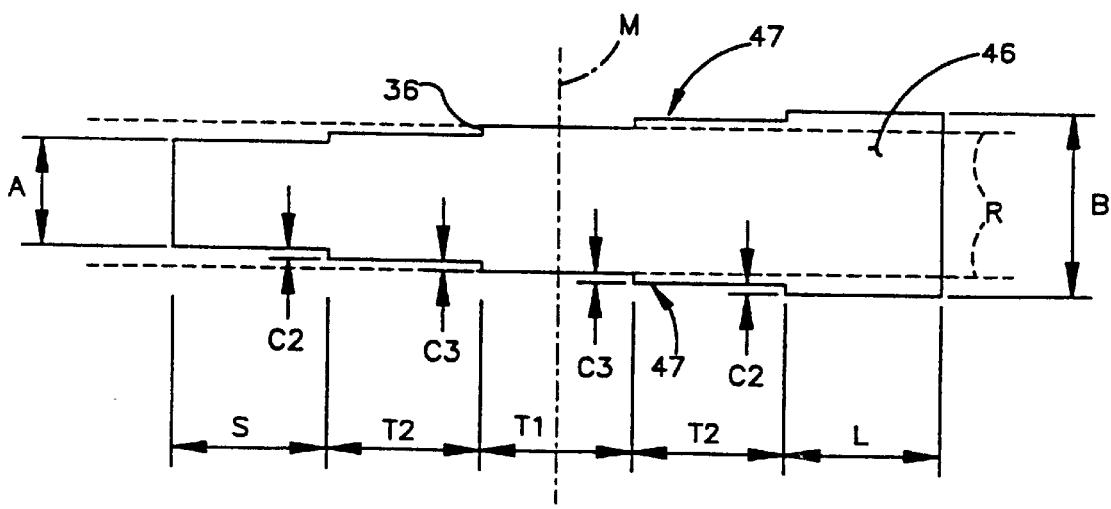
FIG. 6 is a plan view of a tread band of this invention having stepped increases in pitch length.

The transition in pitch length from a shorter pitch length A to a longer pitch length B can be stepped as illustrated in the plan view of a tread band 46 shown in FIG. 6. Tread features have been omitted to help illustrate the features of the invention. This tread band 46 has four step changes in pitch length. These may correspond with the circumferential grooves in a five rib tire tread pattern. The step magnitude is symmetrical with respect to a midcircumferential plane M being one distance C3 for the two internal steps and a second distance C2 for the two lateral steps. The tread band 46 meshes with itself at circumferential edges 47 when rotated end to end. This tread band 46 is combined with a larger tread band 48 as illustrated in the plan view of FIG. 7. The larger tread band 48 has a shorter pitch length C on one end and a longer pitch length D on the other end. The ratio of the minimum pitch length A to the maximum pitch length D is once again in the range of about 0.50 to about 0.75. Two smaller tread bands 46 are meshed at circumferential edges 47 with two larger tread bands 48 in FIG. 7. The actual tread of a tire would have a predetermined number of each of the tread bands 46,48 arranged in a predetermined manner to modulate the tread noise. It is noted that the pitch ratio (i.e. A/D at the lateral ends 26,28) varies across this tread band arrangement. In fact, there are only two pitch lengths in the central segment of the tread. This may allow one to select a relatively small pitch ratio A/D for the most lateral segments of the tread without influencing tread wear. Such a selection would help modulate the noise produced by the lateral ribs of the tire tread pattern. The preferred tread band step arrangement continues to be a single large step made within a groove of the tire tread pattern.

A further embodiment of this invention is a method for producing a change in the pitch lengths of load carrying tread bands. The tread bands are placed adjacent to each other circumferentially around the tire's outer surface and contain tread pattern elements in relief that contact a supporting surface. The location or sequencing of tread bands of different size can help provide a low noise level as the tread of the tire contacts the supporting surface. The invention allows one to use a single tread band that effectively yields two pitch length changes. The steps used to achieve the advantages of this invention are described herein.

A minimum pitch length is selected to keep the tread elements from becoming too small. A minimum pitch is preferably not less than about 1.0 percent of the development length L as previously defined. To keep the larger tread elements from being much larger than the smaller tread elements and producing an uneaven wear problem, a preferred ratio of the smallest pitch length to the largest pitch length is in the range of about 0.50 to 0.75. Selecting this ratio a maximum pitch length is obtained having previously selected the minimum pitch length. Furthermore, the largest pitch length is preferably no more than 2.5 percent of the development length L. The average pitch length is the average of the minimum and maximum values selected. A first variable pitch length tread band is selected having the minimum pitch length at one axial end and a second pitch length at the other axial end of the tread band. A second variable pitch length tread band is selected having the maximum pitch length on one axial end and a third pitch length at the other axial end. Pitch lengths are measured parallel to a midcircumferential plane of the tire. The preferred third pitch length is selected to be greater than the minimum pitch length but less than the second pitch length. The second pitch length is less than the maximum pitch length.

Treads of a tire are formed during the moulding operation in making a tire. The mould is a negative imprint of the relief features forming the exterior configuration of the tread, shoulder areas and sidewalls on a surface that generally conforms to the outer surface of the cured tire. Integral with having a tire with variable pitch tread bands is the making of a number of molds that achieve these bands in a cured tire. The ability to make only a minimum number of molds reduces the cost of manufacturing the tire. The structural features of a mold segment are parallel with those of a tread band which results from the mold, and are within the scope of this invention. For example, one of the tread mold segments looks like one of the tread bands of FIG. 10. However, the grooves become projections from the flat surfaces of the tread blocks. The total mold further extends beyond the tread band's lateral edges 26 and 28 (FIG. 7) to the bead area. The mold segment referred to herein is that portion extending across the tread width TW (FIG. 1).

Figure 7:
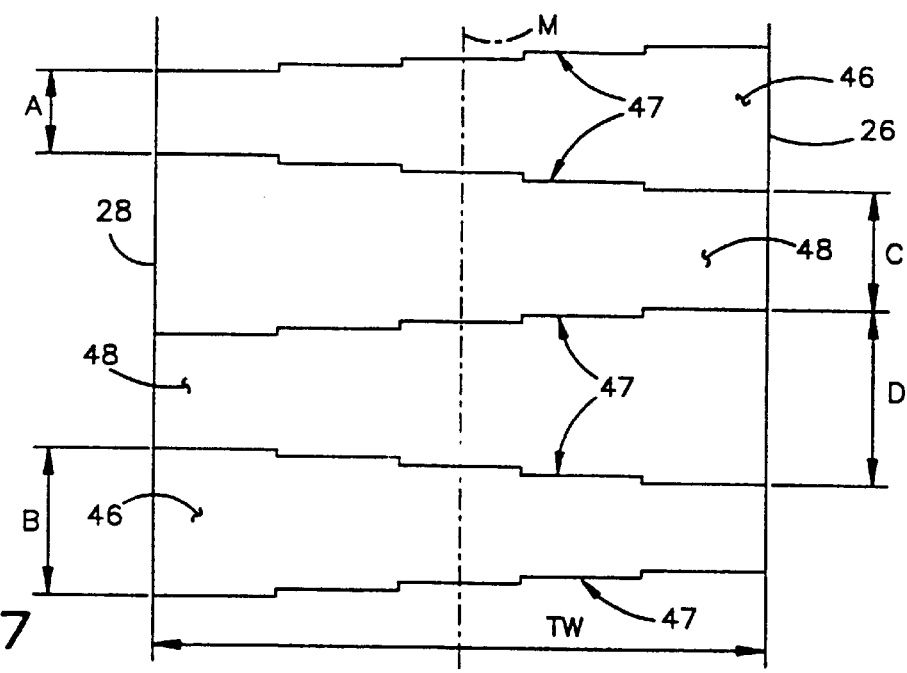
FIG. 7 is a plan view of two tread bands making a sequence of four tread band lengths according to the invention.

The method includes profiling the circumferential edges of each tread band such that they all mesh with each other. It is necessary that there is an equal number of tread bands that are oriented with the smaller pitch length on one axial side and tread bands that are orientated with their larger pitch length located on the same axial side of the tread. Each tread band must be adjacent to a tread band place that has been rotated as shown in FIG. 7. The profiled edges 47 must be anti-symmetrical with respect to a radial plane R perpendicular to the midcircumferential plane (see FIG. 6). That is, on one axial side a first edge will be on one side of the radial plane R and on the other axial side the first edge will be on the other side of the radial plane R. In addition, a second edge will have the same relationship from side to side and will have edges converging with the first edge on one axial side and diverging with the first edge on the other axial side. This makes the edges compatible and mesh with one another regardless of the end to end orientation of the tread bands. The same or similar geometric relationships exist if tread bands, or portions thereof, are positioned diagonally across the tread width TW to make an acute angle with respect to the midcircumferential plane M.

The first and second tread bands are incorporated to form the tread of the tire. The relative position and orientation of the first and second bands are sequenced to circumferentially cover the tire and form the surface of the tire that contacts the supporting surface. Numerous techniques for sequencing the tread bands are known in the art and discussed in the background. Those techniques formulated for four different pitch lengths are appropriate for the two tread bands discussed herein. Once the noise level of the tire is measured the pitch lengths and sequencing can be modulated to optimize the noise level for different surfaces and/or operating conditions of the vehicle.

This invention is not limited to two variable pitch tread bands, as the scope of this invention applies to any number of variable pitch length tread bands. One variable pitch length tread band may be appropriate for some applications where tire noise is not a critical performance criteria. Two variable pitch length tread bands are preferred for most passenger car tires. The scope of this invention also includes the use of constant pitch length tread bands simultaneously along with those having a variable pitch length. The respective edges of the tread bands must be such that all tread bands mesh with each other.

EXAMPLE

Figure 8:
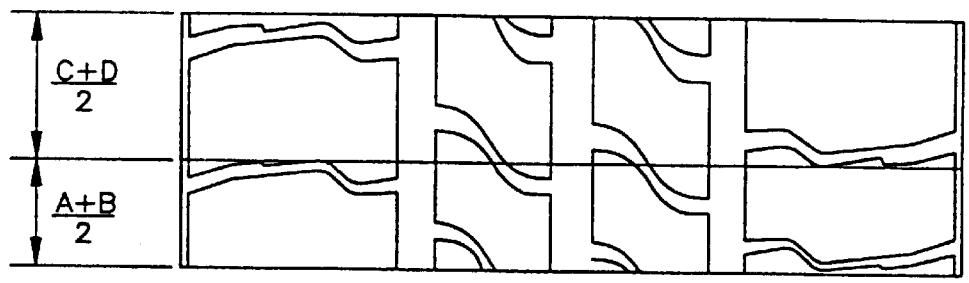
FIG. 8 is a plan view of a tire tread showing two constant length tread bands according to the art.
Figure 9:
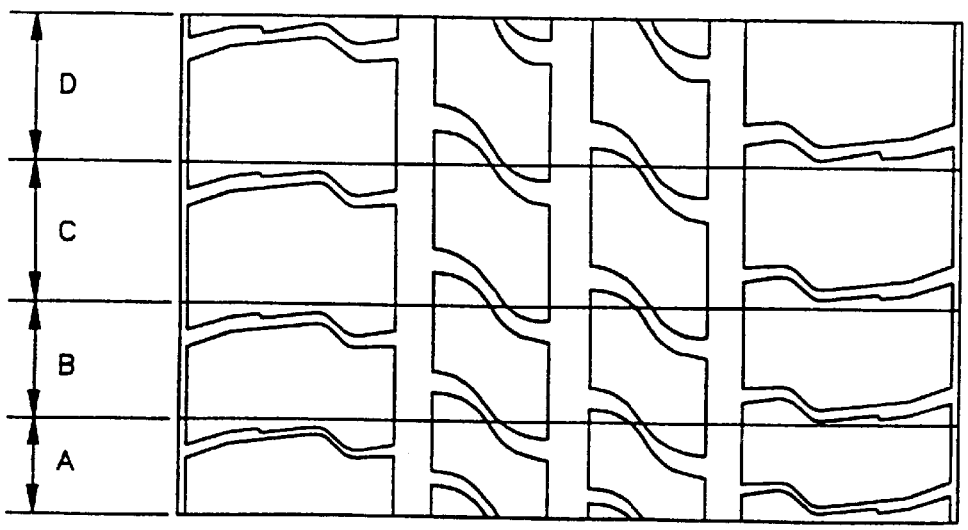
FIG. 9 is a plan view of a tire tread showing four constant length tread bands according to the art.
Figure 10:
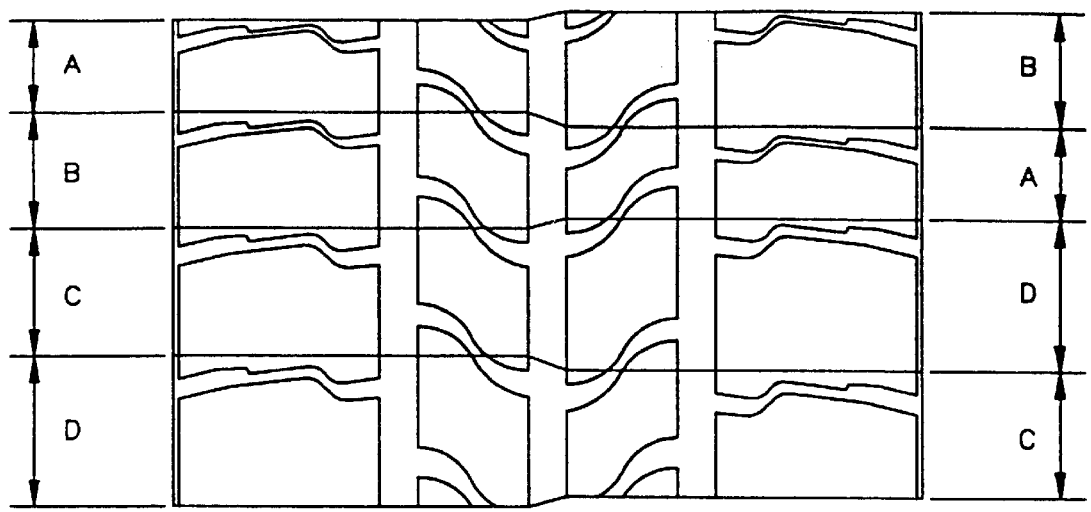
FIG. 10 is a plan view of a tire tread showing two variable length tread bands to make a total of four bands according to the invention.
Figure 11:
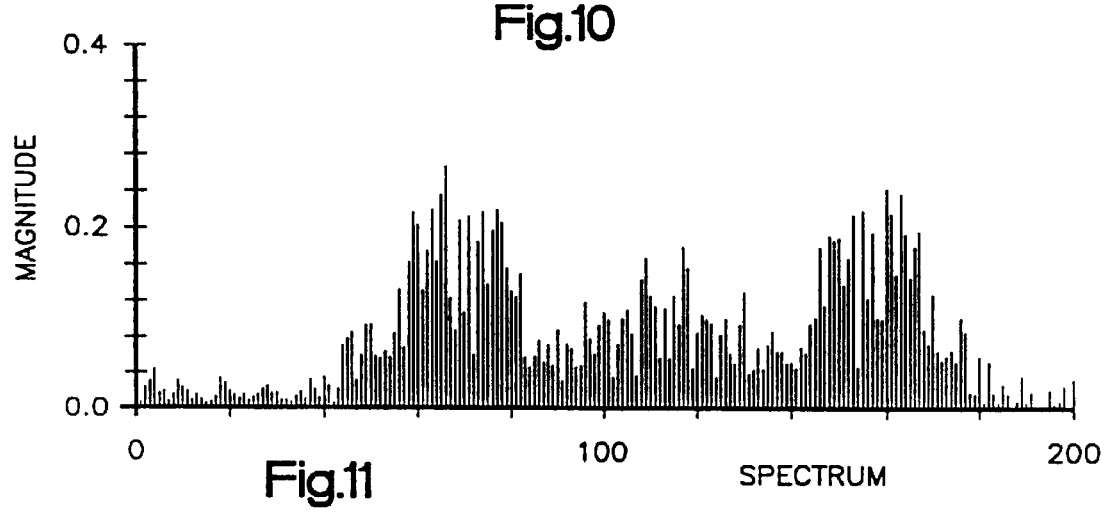
FIG. 11 is a noise magnitude vs. spectrnm plot for a tire tread having the two tread bands of FIG. 8.
Figure 12:
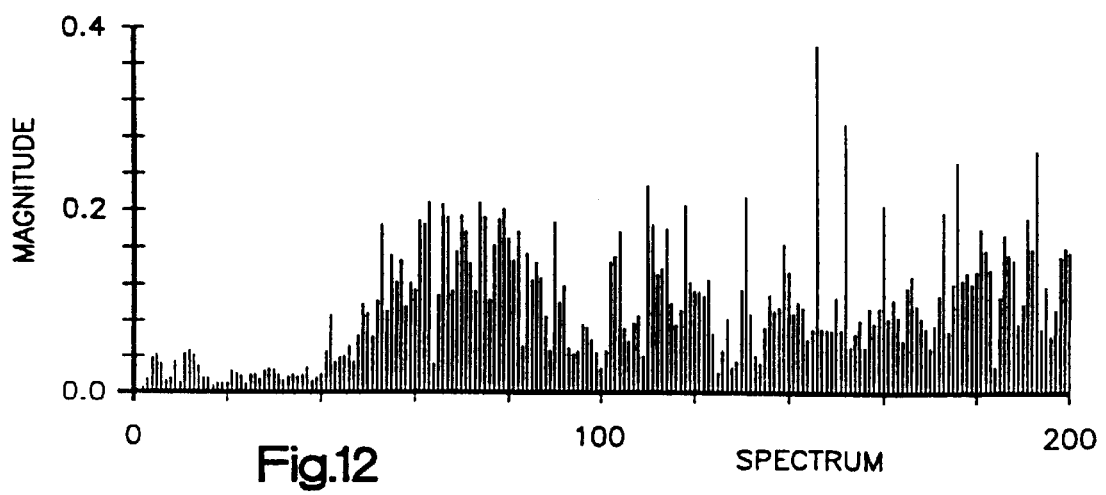
FIG. 12 is a noise magnitude vs. spectrum plot for a tire tread having the four tread bands of FIG. 9.
Figure 13:
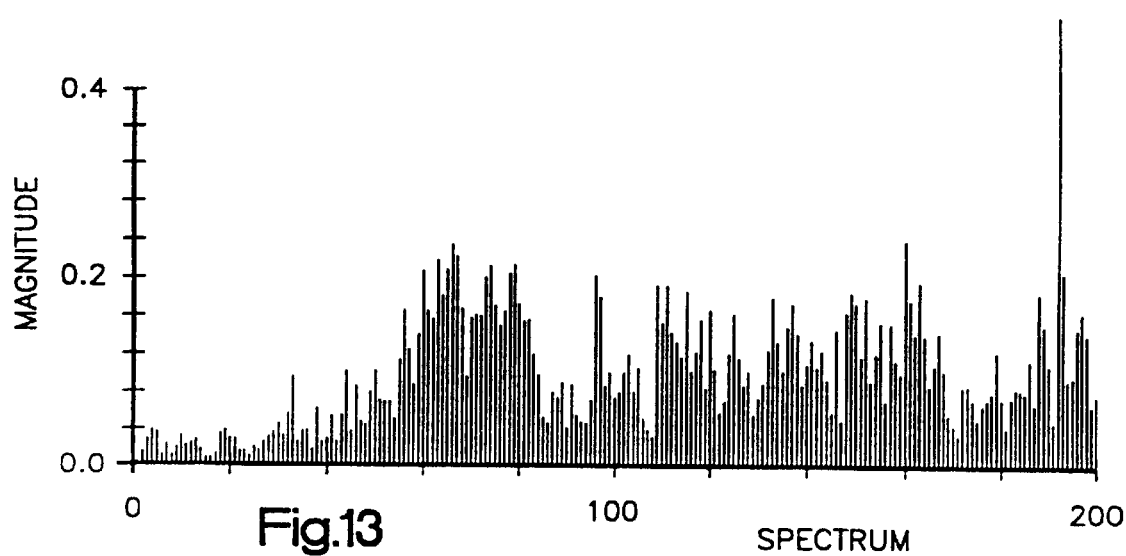
FIG. 13 is a noise magnitude vs. sequence plot for a tire tread having the two tread bands of FIG. 10 according to the invention.

A comparison between the tire noise level using prior art constant pitch length tread bands and those of this invention using variable pitch length tread bands is made using magnitude vs. spectrum graphs as previously described. A plan view showing two constant pitch length tread bands for a tire tread pattern is illustrated in FIG. 8. A magnitude vs. spectrum graph for an optimized tread, using the tread bands of FIG. 8, is shown in Fig. 11. A plan view showing four constant pitch length tread bands for the same tire tread pattern is illustrated in FIG. 9. A magnitude vs. spectrum graph for an optimized tread, using the tread bands of FIG. 9, is shown in FIG. 12. Finally, a plan view showing the use of two variable width tread bands to make a total of four tread bands according to the invention for the same tire tread pattern is illustrated in FIG. 10. A magnitude vs. spectrum graph for the optimized tread, using the tread bands of FIG. 10, is shown in FIG. 13. The optimization technique used in each of these three cases was the same. Results show a definite reduction in the noise magnitude for the tires having four tread bands (FIGS. 12 and 13). These two cases also show little difference in noise magnitude using a total of four tread bands. The two variable pitch length tread bands perform as well as the prior art four constant pitch length tread bands.

A significant reduction in the noise level is anticipated with the use of four variable pitch length tread bands in lieu of four constant pitch length tread bands (FIG. 9). With each of the four variable pitch length tread bands used both with their smallest pitch length on one lateral side of the tread of the tire as well as on the other lateral side of the tread (rotated), the tread noise level can approach that of a tire having eight (8) constant pitch length tread bands. That is, with the same number of different tread bands being manufactured, a reduction in the noise can be achieved using variable pitch length tread bands. By sequencing these eight tread bands (four in one orientation and four rotated end to end) around the tire's tread, lower magnitudes would be achieved than those shown in FIG. 12 for the four constant pitch length tread bands.

Figure 14A:
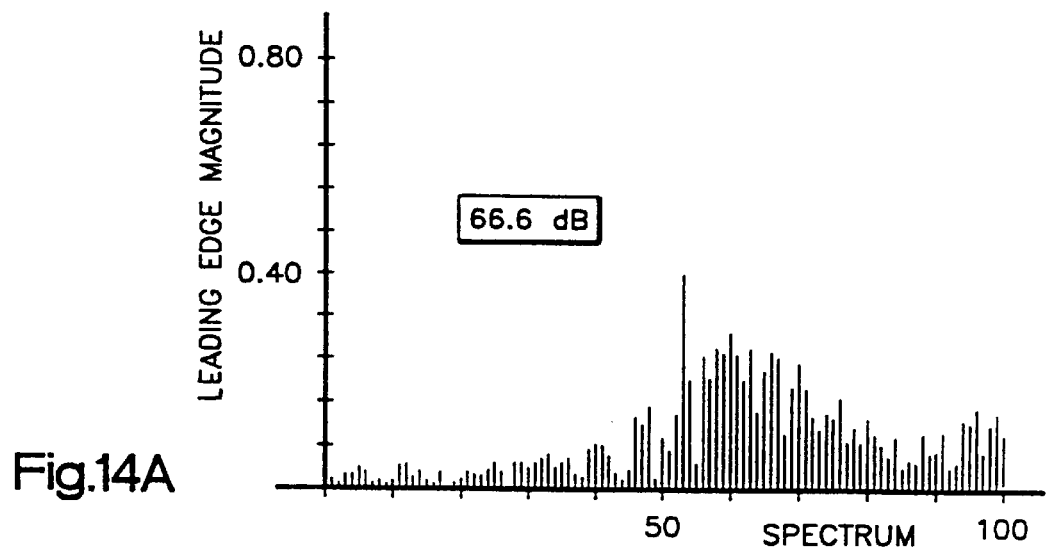
FIGS. 14A–14B are noise magnitude vs. spectrum plots for the same tire tread as FIG. 11 in contact with a supporting surface.
Figure 14B:
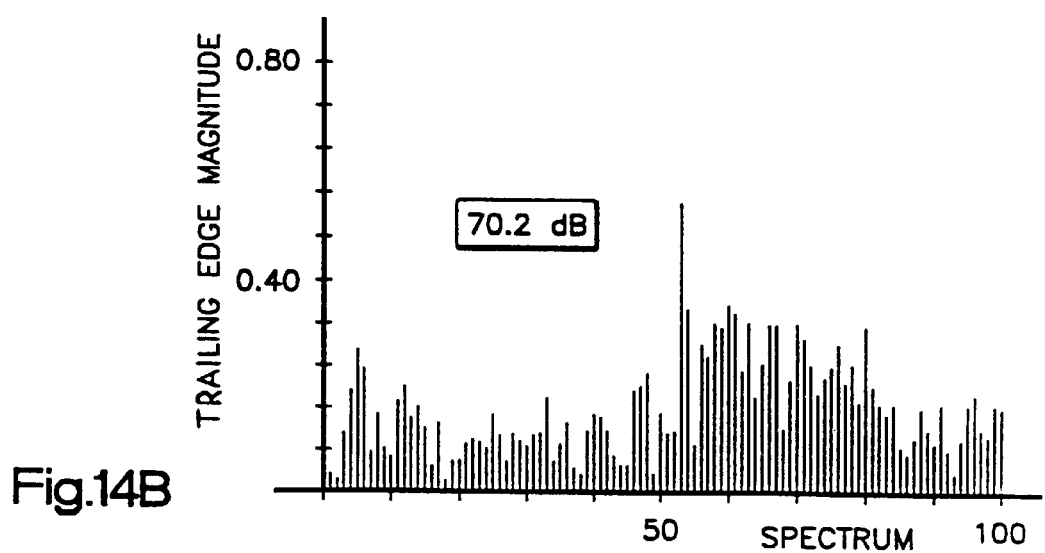
Figure 15A:
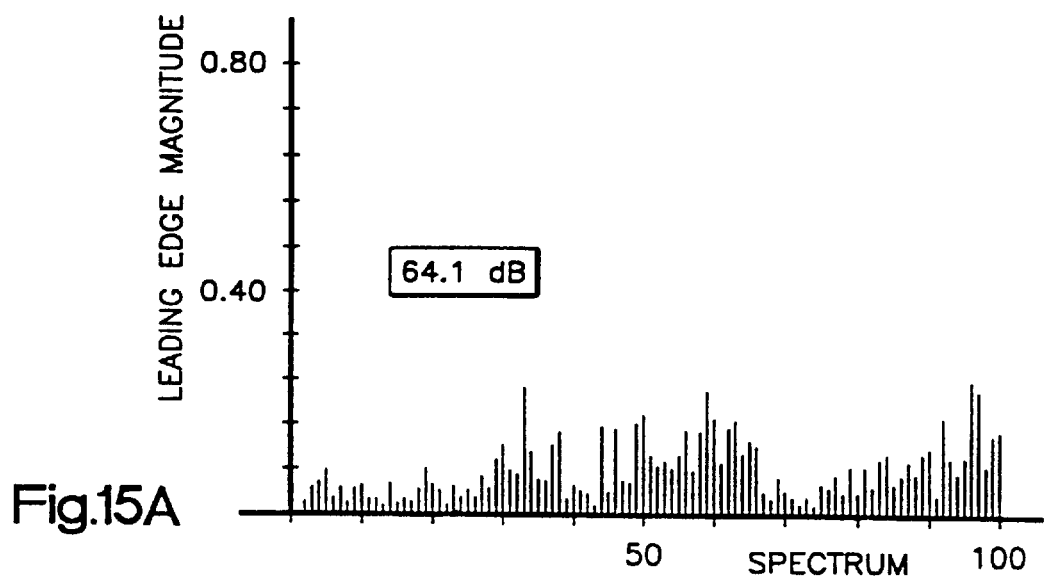
FIGS. 15A–15B are noise magnitude vs. spectrum plots for the same inventive tire tread as FIG. 13 in contact with a supporting surface.
Figure 15B:
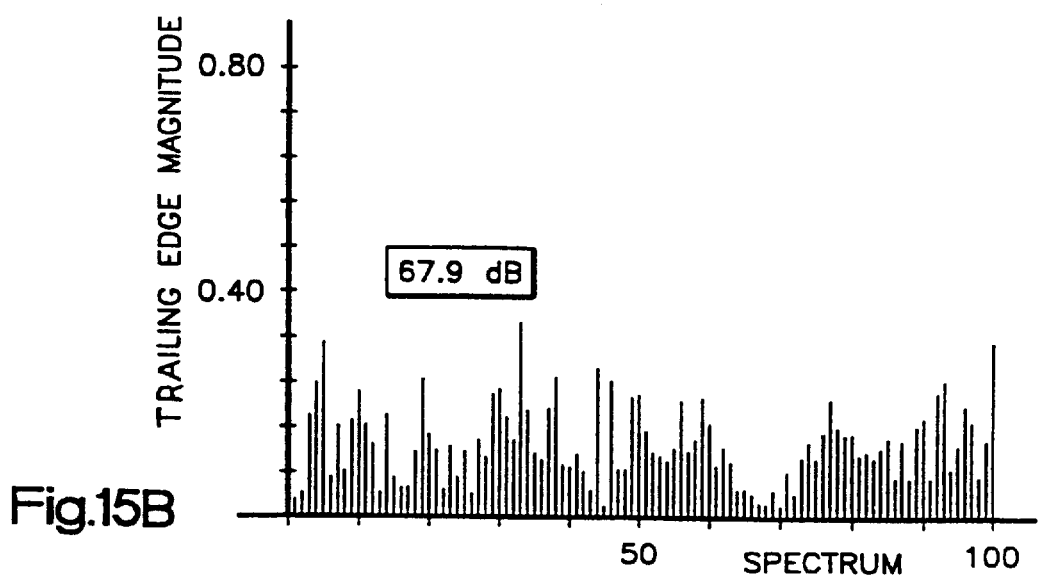

A further evaluation was performed for a mounted, inflated and loaded tire in contact with a supporting surface. A significant portion of the noise is generated as the tread of the tire goes into and comes out of contact with the supporting surface. During tire rolling, the impact of tread features with the supporting surface at a leading edge of contact may be different than impact of tread features at a trailing edge of contact. FIGS. 14A and 15A show the magnitude vs. spectrum for the leading edge of contact where FIGS. 14B and 15B are for the trailing edge of contact. The tire having the tread bands of FIG. 8 are shown in FIG. 14A and 14B and the tire having the tread bands of FIG. 10 are shown in FIG. 15A and 15B. The noise level of the tire having tread bands according to the invention (FIG. 10) is obviously much lower. That is, the magnitude vs. spectrum graph at the leading edge of the tire of this invention (FIG. 10), shown in FIG. 15A, illustrates magnitudes much less than those for the two constant pitch length tread bands (FIG. 8), shown in FIG. 14A. The same conclusions can be made where the magnitude vs. spectrum graph at the trailing edge (FIG. 15B) for the tire having the tread bands of this invention (FIG. 10) illustrates magnitudes much less than those at the trailing edge (FIG. 14B) of the tire having two constant pitch length tread bands (FIG. 8). The overall noise level is commonly represented by the total impact engery given in deciBells (dB). The overall noise level of the tire of this invention was more than two (2) dB lower than the prior art tire; as indicated by the dB values shown on FIG. 14A vs. FIG. 15A as well as those shown on FIG. 14B vs. FIG. 15B.

What is claimed is:

1. A method for making a low noise tire having a tread portion including a plurality of load carrying bands, including the steps of:
   a) selecting a minimum pitch length and a maximum pitch length, the minimum pitch length and the maximum pitch length defining a ratio of minimum pitch length to the maximum pitch length;
   b) providing a first variable pitch length single mold segment for forming a first variable pitch length tread band having the minimum pitch length on one axial side and a second pitch length greater than the minimum pitch length on the other axial side of said first tread band;
   c) providing a second variable pitch length single mold segment for forming a second variable pitch length tread band having a third pitch length smaller than the maximum pitch length on one axial side and said maximum pitch length on the other axial side of said second tread band, said third pitch length being greater than said minimum pitch length but less than said second pitch length and said maximum pitch length being greater than said second pitch length;
   wherein both circumferential edges of both the first and the second single mold segments are profiled the same, such that a trailing circumferential edge of the first single mold segment is capable of meshing with either a leading circumferential edge or a trailing circumferential edge of the second single mold segment and such that a leading circumferential edge of the first single mold segments is capable of meshing with either the leading circumferential edge or the trailing circumferential edge of the second single mold segment;
   d) making a tire having a tread portion wherein said step of making a tire having a tread includes using the first single mold segment and the second single mold segment to form the first variable pitch length tread band and the second variable pitch length tread band respectively, a profiled circumferential edge of the first variable pitch length tread band meshing with a profiled circumferential edge of the second variable pitch length tread band.

2. The method set forth in claim 1, wherein the ratio of the minimum pitch length to the maximum pitch length is in a range of values of about 0.50 to about 0.75.

3. The method set forth in claim 1, wherein the minimum pitch length of said first variable pitch length tread band is at least equal to one percent of a development length of the tread portion of the tire and the maximum pitch of said second variable pitch length tread band is at most equal to two and one-half percent of the development length of the tread portion of the tire.

4. The method set forth in claim 1, wherein each of the mold segments has a first lateral end and a second lateral end and wherein each of the mold segments has a constant pitch length from the first lateral end to a first pair of points, a changing pitch length from the first pair of points to a second pair of points and a constant pitch length from the second pair of points to the second lateral end.

* * * * *